United States Patent

[11] 3,585,415

[72] Inventors Richard S. Muller
Berkeley;
James Conragan, Sunnyvale, both of, Calif.
[21] Appl. No. 864,058
[22] Filed Oct. 6, 1969
[45] Patented June 15, 1971
[73] Assignee The Regents of the University of California

[54] STRESS-STRAIN TRANSDUCER CHARGE COUPLED TO A PIEZOELECTRIC MATERIAL
12 Claims, 5 Drawing Figs.

[52] U.S. Cl. .......... 310/8, 310/8.2, 310/8.7, 317/235
[51] Int. Cl. .......... H01v 7/00
[50] Field of Search .......... 310/8, 8.1, 8.2, 8.6, 8.7, 8.8, 8.3; 29/571; 307/304, 308, 278; 317/234, 235

[56] References Cited

UNITED STATES PATENTS

| | | | |
|---|---|---|---|
| 2,898,477 | 8/1959 | Hoesterey | 310/8.3 X |
| 3,460,005 | 8/1969 | Kanda et al. | 29/571 |
| 3,463,973 | 8/1969 | Fatuzzo et al. | 317/235 |
| 3,450,966 | 6/1969 | Perlman et al. | 29/571 |
| 3,351,786 | 11/1967 | Muller et al. | 310/8.8 |
| 3,322,980 | 5/1967 | Fauve | 310/8.7 |
| 3,294,988 | 12/1966 | Packard | 310/8 |

OTHER REFERENCES

Powell & Lean, " Detection of Piezoelectric Surface Acoustic Wares, " IBM TECH. DISCL. BULLETIN, Vol. 12, No. 5, 10/69.

*Primary Examiner*—Milton O. Hirshfield
*Assistant Examiner*—B. A. Reynolds
*Attorney*—Townsend and Townsend

ABSTRACT: A piezoelectric material is connected to a semiconductor having source and drain electrodes at opposite ends thereof. The piezoelectric material is charge coupled to the semiconductor and spaces and electrically insulated the semiconductor and spaces and electrically insulates the semiconductor from a gate electrode disposed between the source and the drain. Application of a voltage to the source and drain and of a constant voltage to the gate and source causes a current flow which is a function of the stress-strain to which the piezoelectric material is subjected and can thus be employed to indicate the magnitude of such stress-strain.

INVENTORS
RICHARD S. MULLER
JAMES CONRAGAN
BY
Townsend & Townsend
ATTORNEYS

STRESS-STRAIN TRANSDUCER CHARGE COUPLED TO A PIEZOELECTRIC MATERIAL

BACKGROUND OF THE INVENTION

The invention described herein was made in the performance of work under a NASA contract and is subject to the provisions of the National Aeronautics and Space Act of 1958, Public Law 85-568 (72 Stat. 426; 42 U.S.C. 2451), as amended.

Piezoelectric materials comprise a large, if not the largest, class of materials used in the construction of stress-strain transducers. Many such transducers require external amplification and do not produce a direct current DC response to an applied strain. By properly employing the piezoelectric material in the construction of insulated-gate field-effect transistors (IGFET) a stress-strain transducer can be constructed which simultaneously performs the stress-strain sensing and amplification functions. The advantages of such devices include fast response to an applied stress-strain and a small, well-defined sensing area.

One such device is described in U.S. Pat. No. 3,351,786 which is incorporated herein by reference. In that patent an IGFET is formed on a piezoelectric semiconductor material having a source and drain electrode mounted on opposite ends of the piezoelectric body. A conductive gate is insulated from the piezoelectric body and disposed above the channel between the source and drain electrodes. When the piezoelectric body is subjected to mechanical forces there is a change in the charge density at the surface of the piezoelectric body which changes the output current of the device to provide an output which is an analogue of the quantum of stress-strain applied.

Although the device disclosed in that U.S. patent provides very good and generally fully satisfactory results for some applications, its performance, sensitivity and stability are not always as high as desired. In addition it is relatively difficult to construct, particularly in instances where the piezoelectric body must be deposited on a substrate in the form of a thin film.

It is also known to employ a potential from a piezoelectric crystal as a control for the potential exerted by a gate electrode of a conventional transistor. U.S. Pat. No. 3,460,005, incorporated herein by reference, discloses such a device wherein the piezoelectric material forms the substrate for a semiconductor device. Voltages produced across the substrate are picked up by substrate electrodes and transmitted to the gate and source electrodes to obtain a change in the drain current which is a function of the force applied to the substrate. The device disclosed in the U.S. Pat. No. 3,460,005 is an improvement of the first-mentioned prior art device. However, it has a sensitivity and efficiency which are frequently less than fully satisfactory.

SUMMARY OF THE INVENTION

The present invention provides an insulated-gate field-effect transistor employing a piezoelectric material as either the gate-channel insulator or as a layer sandwiched between non-piezoelectric layers of the gate channel insulator, or comprising portions of or the entire substrate material. Combinations of the foregoing are also envisaged.

In their broadest form stress-strain transducers constructed according to the invention comprise a semiconductor having conductive source and drain electrodes at opposite ends thereof and a piezoelectric material charge coupled to the semiconductor device. A gate electrode is mounted to the piezoelectric material so that it is electrically insulated from the semiconductor device by the piezoelectric material. Application of a constant electric potential to the gate electrode and of a force to the piezoelectric material causes an electrostatic field in the semiconductor channel, and thus varies the number of carriers in the channel which is a function of the force induced stress in the piezoelectric material. Application of a voltage to the source and drain electrodes thus causes a current flow in the semiconductor device which is also proportional to the stress-strain in the piezoelectric material.

One form of the invention is practiced by forming the insulator between the gate and the semiconductor channel of the piezoelectric material. When employing piezoelectric insulators there are no constraints on the semiconductor device other than its compatibility with normal device processing since the strain induced piezoelectric charge induces a corresponding change in the charge (number of carriers) in the channel between the source and the drain electrodes without the need for varying the gate voltage as a result of the interposition of piezoelectric material between or the charge coupling with the gate and the semiconductor. A corresponding change in the current flowing through the semiconductor is suitably sensed.

Alternatively, the semiconductor is mounted on a piezoelectric substrate. A counterelectrode, or second gate, is placed on the side of the substrate opposite the semiconductor device and is aligned with the first gate. Stress induced piezoelectric charges again cause changes in the semiconductor channel charge to alter thereby the current between the source and the drain electrodes as a function of the strain on the piezoelectric substrate. Proper operation of the device requires that the semiconductor channel is not too distant from the substrate to prevent sufficient charge coupling and sensitivity. The semiconductor device should therefore have a layer thickness comparable to a Debye length.

Stress-strain transducers constructed in accordance with the invention provide better performance than prior art stress-strain transducers and exhibit greater stability. This is a direct result of eliminating gate voltage variations via piezoelectrically produced potentials, which lessens the sensitivity, efficiency and response time of the device because the gate and the semiconductor act as a capacitor and must be charged up. In the present invention a direct coupling between the piezoelectric material and the semiconductor is provided so that a direct change in the charge of the semiconductor from the piezoelectric material is obtained.

The transducers of the invention are thus ideally suited for the most exacting applications. In addition, they are relatively easier to construct and permit the use of a wider range of materials to obtain special effects as, for example, the utilization of both the piezoelectric and piezoresistive effects of the materials to increase the sensitivity of the transducer.

Conventional semiconductor materials such as silicon, germanium and the like can be employed to enhance significantly the field of applications for strain transducers. Moreover, highly piezoelectric materials such as piezoelectric ceramics which cannot be vacuum deposited in thin film form can be employed to form the above referred to piezoelectric substrate of the transducer.

In a particularly useful form of the invention the transducer is provided with a layered insulator having a thin piezoelectric layer sandwiched therebetween and positioned between the gate and the channel of an IGFET. The piezoelectric layer and insulator extend substantially past the source and drain electrodes and beyond the channel region so that the piezoelectric layer can act as a medium for the propagation of stress or strain waves. A transducer of a foregoing type is sensitive to mechanical waves propagating in the piezoelectric medium due to a sender unit elsewhere on the crystal. Such a transducer is valuable, for example, as an integrated-circuit element in which signal representation in the form of mechanical waves allows for long time delays in circuit processing.

A transducer sensitive to strain waves can also be constructed on a piezoelectric substrate device which does not require for this use any electrode counter to the semiconductor channel. However, such a transducer includes the conventional insulated gate electrode.

DESCRIPTION OF THE PREFERRED EMBODIMENTS

Figure 1:
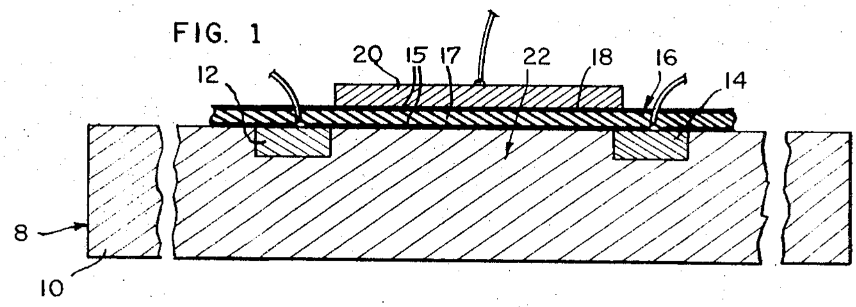
FIG. 1 is a cross-sectional, grossly enlarged view of a stress-strain transducer constructed in accordance with the present invention.
Figure 4:
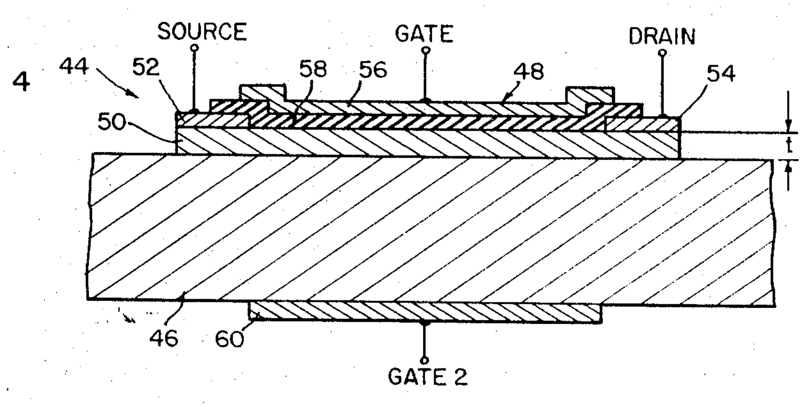
FIG. 4 is a grossly enlarged cross-sectional view of another embodiment of the present invention.

Referring to FIG. 1, an electrical transducer 8 constructed in accordance with the invention comprises a semiconductor device 10 formed of a semiconductor material such a silicon, germanium, cadmium sulfide, cadmium selenide or tellurium. A source electrode 12 and, spaced therefrom, a drain electrode 14 are placed on the semiconductor devise; they are conventionally constructed to provide an ohmic connection to the semiconductor. An insulator 16 is placed over face 18 of the semiconductor and electrically insulates a gate electrode 20 from the semiconductor. The gate electrode is positioned between the source and the drain electrodes in the channel region 22 of the semiconductor. In the transducer illustrated in FIG. 1 the semiconductor material and the insulator extend past the source and drain electrodes for purposes more fully described below. In many applications, however, the source and drain electrodes will be placed at the ends of the semiconductor material as shown in FIG. 4.

In accordance with the invention the insulator is constructed of a single or multilayer piezoelectric material. In the latter case nonpiezoelectric insulating layers 15 of such materials as silicon monoxide, silicon dioxide or aluminum oxide, for example, have sandwiched between them a layer 17 of a suitable piezoelectric material such as crystalline barium titanate, quartz, Rochelle salt and the like.

The illustration of stress-strain transducer 8 in FIG. 1 has been greatly enlarged to show more clearly its components. In actuality the thickness of the semiconductor device 10 and the piezoelectric insulator 16 are in the order of about 1,000 Angstrom (A.) and typically vary between about 400 A. and 2,000 A. The stress-strain transducer is therefore usually incapable of self-support and is applied to a suitable substrate (not shown in FIG. 1). Such application is most conveniently performed by vacuum depositing the semiconductor device and the insulating layer at elevated temperatures from a suitable source. Similarly, the electrodes of the stress-strain transducer are preferably also vacuum deposited. Since these processes are well known in their art they are not further described herein. Furthermore, the thickness of the piezoelectric layer is such that the electrostatic field from the gate electrode reaches the semiconductor.

Figure 2:
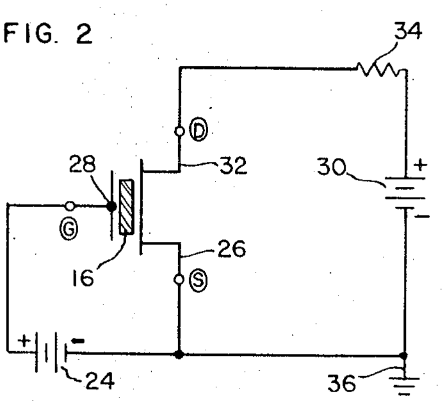
FIG. 2 is a schematic circuit diagram illustrating the electrical installation of the stress-strain transducer of FIG. 1 for obtaining stress-strain measurements.
Figure 3:
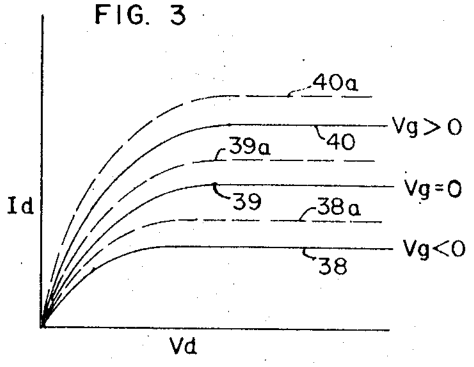
FIG. 3 is a current voltage diagram illustrating typical values of current voltage ratios when stress-strain is applied; the solid lines indicate a typical condition when no stress-strain is applied and the broken lines indicate a typical condition with the application of stress-strain.

Turning now to the use of stress-strain transducer 8 illustrated in FIG. 2, and referring to FIGS. 1 through 3, for a typical *n*-channel device a first DC power source 24 is connected to source electrode 26 to subject that electrode to a negative potential and to gate electrode 28 to subject the gate electrode to a positive potential. A second DC power source 30 has its positive terminal connected to drain electrode 32 via a load resister 34 and its negative terminal connected to source electrode 26 and ground 36.

When the stress transducer is electrically connected to the poser sources as illustrated in FIG. 2 and described in the preceding paragraph, the application of stresses to the transducer, as by subjecting it to bending forces, results in the piezoelectric polarization of the piezoelectric insulator 16 and causes a charge of the semiconductor device which changes the number of carriers in channel region 20 of the semiconductor while the gate voltage remains constant. Consequently, the drain current in the semiconductor device changes as a function of the piezoelectric polarization and, therefore, of the stress or strain applied to the piezoelectric insulator. For maximum sensitivity of the stress transducer the piezoelectric polarization should be normal to the channel of the semiconductor.

FIG. 3 illustrates changes in the drain current due to stresses in the piezoelectric insulator of stress transducer 8. The drain current $I_d$ is measured along the vertical axis and the drain voltage $V_d$ is indicated along the horizontal axis of the diagram. When the stress transducer is in its relaxed state, that is when no forces are applied to it, current values are illustrated by solid lines 38, 39 and 40 for different values of constant gate voltages applied to the transducer. Application of a constant force, e.g. a bending moment, to the stress transducer increases the drain current under the various constant gate voltages as illustrated by broken lines **38*a*, 39*a* and 40*a***.

The curves in FIG. 3 illustrate that variations in the stress or strain within piezoelectric insulator 16 from variations in the applied forces cause corresponding changes in the drain current which are proportional to or an analogue of the amount of force applied. Thus, the drain current can be measured in a conventional manner by suitably calibrating an ampere meter so that the quantum of stress or strain can be directly read off the meter.

Under ideal conditions and with the selection of the proper materials the obtained signal is DC. Ordinarily, however, leakage, relaxation in the piezoelectric material and the like cause very low frequency AC current.

The stress-strain transducer illustrated in FIG. 1 and described in the proceeding paragraphs provides very fast response to changes in the applied forces since it employs a direct charge coupling of the piezoelectric material and the semiconductor. Moreover it permits the use of well-known conventional semiconductor materials such as silicon or germanium to assure maximum control over the transducer's operating characteristics and manufacture.

Furthermore, the transducer of the invention permits a sensitivity increase over prior art stress transducers by employing the piezoresistive characteristics of the semiconductor material. Even though semiconductor materials are usually not piezoelectric they often are piezoresistive. For example, silicon and germanium have piezoresistive properties. When forces are applied to the semiconductor the piezoresistancy of the material causes it to change (either positively or negatively) the mobility of the carriers. By selecting the polarization of the piezoelectric insulators (or substrate) so that it affects the number of carriers in the same manner as the semiconductor's piezoresistive effect the net drain current in the semiconductor is increased, thus resulting in an increased sensitivity of the transducer.

A typical transducer employing both the piezoresistive effect of the semiconductor and the piezoelectric effect of the piezoelectric insulator comprises a silicon for the semiconductor and triglycine sulfate or lithium niobate for the piezoelectric insulators.

In one embodiment of the present invention (illustrated in FIG. 1) the semiconductor material 10 and insulator 16 extend beyond source and drain electrodes 12, 14. This permits the propagation of mechanical waves that are conventionally generated by a sender unit, for example. The piezoelectric material then transforms the mechanical waves into electrical signals (charges) that correspondingly affect the current flow in the semiconductor to thereby permit the electrical sensing of such waves. The semiconductor and insulator can extend past the source and drain electrodes, an arbitrary distance depending upon the application.

The transducer described in the preceding paragraph provides a sensitive and accurate "readout" device for stress and/or strain waves. It is constructed by employing present solid-state device manufacturing techniques. The semiconductor comprises a single-crystal silicon substrate. The insulator is defined by a layer of thermally grown silicon oxide. Deposited cadmium sulfide is used as the piezoelectric layer and aluminum as the gate material. Typical fabrication encompasses the forming of the source and the drain for the IGFET on a silicon substrate by conventional planar techniques, thermally growing roughly 500 Angstroms of silicon oxide, overlaying it with roughly 500 to 1,000 Angstroms of an oriented piezoelectric film such as cadmium sulfide or cadmium selenide, applying a third insulating layer (sputter-deposited aluminum oxide or silicon dioxide, for example), and finally depositing the gate electrode.

Figure 5:
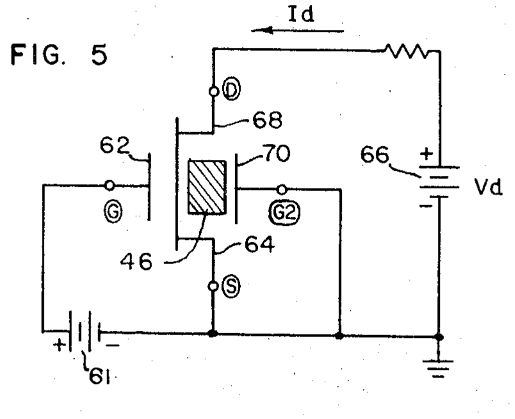
FIG. 5 is an electric circuit diagram for the stress-strain transducer illustrated in FIG. 4.

Referring to FIGS. 4 and 5 in another embodiment of the present invention a stress-strain transducer 44 is provided with a piezoelectric substrate 46. The transducer includes a conventional field-effect transistor 48 comprising a semiconductor device 50, source and drain electrodes 52 and 54, respectively, a gate electrode 56 and a layer 58 of an insulating material between the semiconductor device and the gate electrode. The gate electrode is placed between the source and drain electrodes in the channel region of the field-effect transducer and can be employed to control the conductance of the semiconductor. Any suitable material can be employed for the construction of semiconductor device 50; the insulating layer is constructed of a nonpiezoelectric material such as silicon monoxide or dioxide, and the electrodes comprise metallic deposits.

The semiconductor device, the insulating layer and the electrodes are vacuum deposited on the piezoelectric substrate 46 substantially as described above. The semiconductor thickness "*t*" is maintained in the order of a Debye length (a known measure of how much an electric field will penetrate a semiconductor) of such material. If the semiconductor thickness exceeds a Debye length significantly, the separation between the field-effect transducer channel and the piezoelectric substrate becomes too great to provide efficient electrical coupling, and would result in drain current changes of insufficient magnitude and would thus cause a substantial decrease in the transducer's sensitivity.

A counterelectrode or second gate 60 is placed on the opposite side of substrate 46 in alignment with the channel region of the field-effect transducer and the first gate electrode 56. Functionally, the second gate 60 is comparable to gate 20 of the transducer illustrated in FIG. 1.

Referring to FIG. 5, the electric connections for the use of transducer 44 are substantially identical to those illustrated in FIG. 2 for use with transducer 8 illustrated in FIG. 1. A first DC power source 62 has its positive terminal connected to gate electrode 62 and its negative terminal connected to source electrode 64. A second DC power source 66 again has its positive terminal connected to drain electrode 68 and its negative terminal to source electrode 64. Second gate 70, (60 in FIG. 4) is electrically connected to the negatively biased source electrode 64.

Transducer 44 is used in the manner described above. Piezoelectric polarization of substrate 46 under the application of mechanical forces causes corresponding changes in the drain current through the semiconductor (via the field-effect) and piezoelectric substrate polarization which can be measured to thereby obtain a reading of the stress in the substrate.

Although the functioning of the device is virtually the same as that of stress transducer 8, transducer 44 enables the use of noncrystalline piezoelectric ceramic materials, such as ceramic barium titanate, which cannot be vacuum deposited in the required film thicknesses. Thus, substrate 46 can have any practical thickness and ordinarily varies in thickness between about 0.002 to about 0.050 inch. Piezoelectric ceramic materials, which allow excellent control of their piezoelectric properties, and which, for the purposes of this invention are often superior to crystalline piezoelectric materials, can be used for constructing stress transducers in accordance with the present invention.

Second gate 60 illustrated in FIG. 5 can be omitted in cases in which stress waves in the piezoelectric substrate are being measured.

While several embodiments of the invention have been shown and described, it will be apparent that other adaptations and modifications can be made without departing from the true spirit and scope of the invention.

I claim:

1. A stress-strain transducer comprising an active semiconductor element having spaced-apart conductive source and drain electrodes, a piezoelectric body placed against and electric flux coupled with the semiconductor element, a conductive gate electrode mounted to the piezoelectric body, the gate electrode and the piezoelectric body overlying a portion of the semiconductor element intermediate the source and drain electrodes, means for providing a constant gate voltage to the gate, and means for providing a drain voltage to the source and the drain, whereby the application of a mechanical force to the transducer directly subjects the element to electric flux, generated by the piezoelectric body and causes a current flow in the element that is a function of the quantum of stress-strain applied to the transducer.

2. A stress-strain transducer according to claim 1 wherein the body of piezoelectric body comprises a plurality of layers of piezoelectric and insulating materials between the semiconductor element and the gate electrode.

3. A stress-strain transducer according to claim 1 wherein the piezoelectric body comprises a substrate for the semiconductor element, and wherein the transducer further includes a second conductive gate electrode mounted to the substrate and disposed on the side of the substrate opposite from the semiconductor element, and means for subjecting the second gate electrode to a constant voltage.

4. A stress-strain transducer according to claim 3 wherein the semiconductor element has a thickness of the order of about 1 Debye length for the material of which the semiconductor element is constructed.

5. A stress-strain transducer according to claim 3 wherein the substrate comprises a piezoelectric ceramic material.

6. A stress-strain transducer according to claim 2 wherein the semiconductor comprises silicon, and the layers include a first silicon oxide layer contacting the semiconductor element, a layer of cadmium sulfide and a second aluminum dioxide insulating layer, and wherein the layers have an aggregate thickness permitting their full penetration by an electrostatic field generated by a DC bias on the gate electrode.

7. A stress-strain transducer according to claim 2 wherein the semiconductor element and the piezoelectric body extend past the source electrode and the drain electrode for propagating mechanical waves through the piezoelectric body and converting such waves into electrical signals.

8. A stress-strain transducer comprising a semiconductor device having conductive source and drain electrodes at opposite ends thereof, a piezoelectric material in contact with and directly charge coupled to the semiconductor device and positioned adjacent a semiconductor device channel between the electrodes, a gate electrode mounted to the piezoelectric material, electrically insulated from the semiconductor device by the piezoelectric material and positioned on the side of the piezoelectric material opposite the channel, and means for applying a constant electric potential to the gate electrode, whereby the application of mechanical forces to the transducer directly subjects the semiconductor device to an electrical field generated by the piezoelectric material to thereby directly and rapidly change the number of carriers in the channel of the semiconductor device in proportion to the electrical field generated by the piezoelectric material and thus the stress-strain to which the transducer is subjected.

9. A stress-strain transducer according to claim 8 wherein the semiconductor device comprises a piezoresistive material so that the application of a force to the device affects the electrical resistance of the device, and wherein the piezoelectric material is selected and mounted to the device so that its effect on the number of carriers and the current magnitude in the device when the transducer is subjected to said forces and the effect of the potential applied to the source and drain electrodes is of like polarity as the change in current magnitude due to the piezoresistive effect of the device material.

10. A stress-strain transducer according to claim 8 including another gate electrode mounted to and electrically insulated from the semiconductor device and disposed on the side of the semiconductor device opposite from the first gate electrode, and wherein the semiconductor device has a thickness comparable to the Debye length of the material of which the semiconductor device is constructed.

11. A stress-strain transducer comprising a thin layer of a semiconductor material having conductive source and drain electrodes at the opposite ends of a semiconductor channel, a gate electrode mounted to and insulated from the semiconductor material and disposed over the channel, a piezoelectric material attached to and having a direct electrical flux coupling to the semiconductor material and disposed over the channel, and means providing a drain voltage to the source and drain and a constant gate voltage to the gate, so that application of mechanical forces to the transducer causes variations in the electric field of the piezoelectric material to thereby change the electric charge of the semiconductor channel and current flowing through the semiconductor material thereby becomes a function of the quantum of mechanical stress-strain applied to the transducer.

12. A stress-strain transducer according to claim 11 wherein the gate electrode is mounted to the piezoelectric material and insulated from the semiconductor material by the piezoelectric material.